United States Patent [19]

Takeuji

[11] Patent Number: 4,591,682

[45] Date of Patent: May 27, 1986

[54] MICROWAVE OVEN WITH IMPROVED TURNTABLE DRIVE

[75] Inventor: Koichi Takeuji, Nara, Japan

[73] Assignee: Sharp Kabushiki Kaisha, Osaka, Japan

[21] Appl. No.: 631,730

[22] Filed: Jul. 17, 1984

[30] Foreign Application Priority Data

Jul. 28, 1983 [JP] Japan ................. 58-140197

[51] Int. Cl.⁴ .............................. H05B 6/64
[52] U.S. Cl. ...................... 219/10.55 F; 219/10.55 R
[58] Field of Search ................. 219/10.55 F, 10.55 M, 219/10.67, 10.69; 248/349, 415, 522, 666; 108/20, 21, 139, 142; 211/53, 56, 163, 144

[56] References Cited

U.S. PATENT DOCUMENTS 4,149,056 4/1979 Kaneshiro et al. ...... 219/10.55 F X
4,424,430 1/1984 Algren et al. ............. 219/10.55 F
4,453,064 6/1984 Toyoda et al. ............. 219/10.55 F Primary Examiner—C. L. Albritton
Assistant Examiner—M. M. Lateef
Attorney, Agent, or Firm—Birch, Stewart, Kolasch & Birch

[57] ABSTRACT

A configuration of the improved turntable drive unit of a microwave oven comprising; a choke hole provided in the back of the bottom plate of the oven functioning as a coupling receiver to hold the coupling that freely rotates, and the coupling holder being engaged with the output shaft connects the coupling shaft to the output shaft. The improved configuration simplifies the connection of the output shaft and the coupling unit of the turntable drive unit, thus eventually making it possible to achieve a compact-size drive unit and cost reduction as a result of the eliminated conventional parts.

4 Claims, 7 Drawing Figures

MICROWAVE OVEN WITH IMPROVED TURNTABLE DRIVE

BACKGROUND OF THE INVENTION

The present invention relates to the configuration of the improved turntable drive unit for transmitting the revolution force to the turntable of a microwave oven.

Conventionally, such a microwave oven containing a turntable transmits the revolution force to it via the coupling assembly shown in FIG. 1. In FIG. 1, reference number 40 indicates the turntable, 41 the bottom plate of the oven unit, 42 the drive motor, 43 the output shaft of the drive motor 42, and 44 the coupling assembly, respectively. The drive motor 42 is installed to the motor base plate 45 which is secured to the underside of the bottom plate 41 with screws. A hole is provided on the oven bottom plate 41, while the output shaft 43 is provided in the center of the hole in the direction opposite from the bottom plate 41. The top of coupling assembly 44 is engaged with the bottom of the turntable 40. The coupling assembly 44 is inserted into the hole so that it can be held at its lower shaft using the coupling receiver 46 and the coupling spacer 47 and also via the bearing spacer 48 in order that it can rotate freely. The shaft portion of the coupling assembly 44 and the output shaft 43 are respectively engaged with each other via pin 49 that connects them together, thus making it possible to transmit the revolution force of the output shaft 43 to the turntable via the coupling assembly 44. A rubber cap 50 is provided at the tip portion of pin 49 which is in contact with the shaft portion of the coupling assembly 44 in order that pin 49 can be protected from damage during operation. The coupling receiver 46 is formed by the sheeting process and provides a choke hole 52 which allows rotation of the output shaft 43 to be transmitted to turntable 40. Packing 51 is secured to the outer circumference of the flange of the coupling receiver 46 which is fastened to the bottom plate 41 of the oven.

As mentioned above, since any conventional microwave ovens using the turntable use a number of coupling parts including the coupling 44, coupling receiver 46, coupling spacer 47, and the shaft spacer 48, etc., the production and assembly cost unavoidably rises. In particular, since the conventional turntable has a construction in which the output shaft 43 and the shaft of the coupling assembly is engaged with each other via pin 49, if the turntable 40 is manually rotated while the motor remains off, the revolving force will be directly transmitted to the output shaft 43, thus causing the motor 42 to be destroyed unexpectedly.

OBJECT AND SUMMARY OF THE INVENTION

The present invention aims at providing the improved configuration of the turntable drive unit of a microwave oven, which can completely eliminate disadvantages still present in the conventional turntable drive unit by embodying the following:

Using the choke hole in the bottom plate of the oven receiving the coupling, the coupling unit can be held in the choke hole for free revolution. By engaging the shaft portion of the coupling unit with the output shaft via the coupling holder being coupled with the output shaft, the number of the needed parts can be greatly reduced, and yet, the entire drive unit can be compactly built, thus resulting in the cost reduction in the production and assembly operations. In particular, the preferred embodiment of the present invention effectively prevents any unwanted external force applied to the turntable from unreasonably being transmitted to the motor unit in any circumstances.

To achieve these objects, the preferred embodiment of the present invention provides the configuration described below.

A coupling holder is provided with the shaft having its pivotal center identical to that of the output shaft on the bottom plate of the oven located above the output shaft, while the choked portion makes up the choke hole that projects itself into the back of the oven bottom plate. The coupling holder being engaged with the output shaft rotates as the output shaft starts to rotate, while the coupling holder is provided with the connector nail at its upper position. The coupling unit is provided with the connector part at its upper position to allow its connection to the pivotal center of the turntable and the connector shaft at its lower position to allow its connection to the connector nail. Using these, the connector shaft portion of the coupling units is inserted via the choke hole from the upper position so that it can be engaged with the connector nail of the coupling holder located in the lower position. The pivotal center of the turntable is connected to the connector part of the coupling holder in order that the revolution force of the output shaft can be transmitted to the turntable.

Since the preferred embodiment of the present invention securely receives the coupling unit at the choke hole, no coupling receiver is needed, and yet, since the coupling unit can be engaged with the output shaft by simply connecting the coupling unit to the coupling holder, such a conventional pin can be eliminated otherwise needed for engaging the output shaft with the coupling unit. As a result, the present invention provides the improved turntable driver unit made of an extremely simple configuration at low cost. The improved configuration also eliminates the conventional spacer and the coupling receiver, thus making it possible to realize a compact-size turntable drive unit featuring the reduced parts, which in turn allows the manufacturers to achieve the cost saving from the production and assembly works.

Also, since the engagement between the nail part of the coupling holder and the shaft of the coupling unit can be securely supported by the elasticity of the nail part, even if any external force has been applied to the coupling unit, the coupling unit will merely slip itself without transmitting any excessive torque to the output shaft. As a result, the improved configuration embodied by the present invention perfectly protects the motor that drives the output shaft.

DETAILED DESCRIPTION OF THE INVENTION

Figure 1:
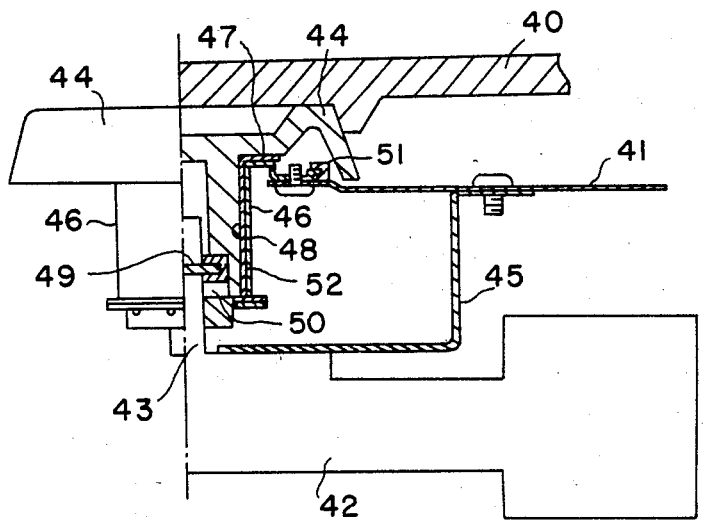
FIG. 1 shows the sectional view of the turntable drive unit of a conventional microwave oven.
Figure 2:
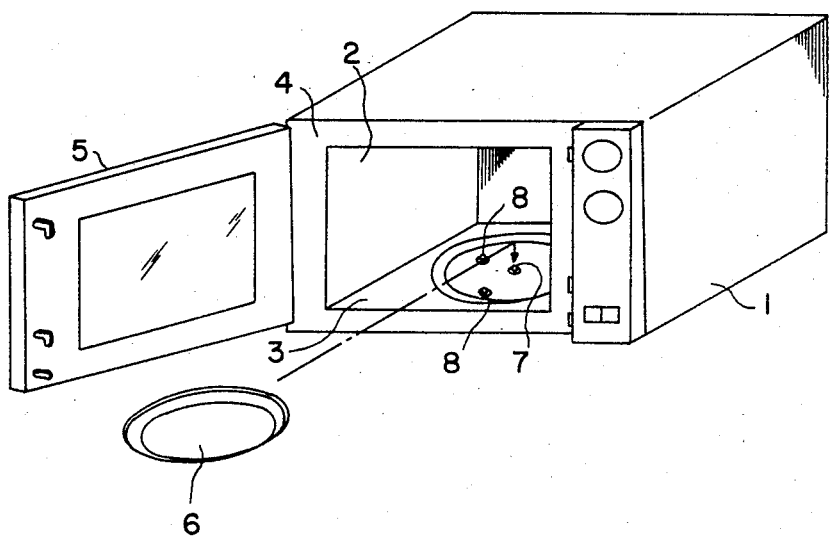
FIG. 2 shows an external view of a microwave oven incorporating the turntable embodied by the present invention.

FIG. 2 shows the external view of a microwave oven incorporating the configuration of the turntable drive unit as a preferred embodiment of the present invention. In FIG. 2, reference number 1 indicates the microwave oven housing, reference number 2 the microwave oven, reference 3 the bottom plate of the oven located on the bottom of the oven 2, reference number 4 the front panel, reference number 5 the door installed to the front panel, and reference number 6 the turntable, respectively.

The turntable 6 is connected to the coupling unit 7 located in the center of the bottom plate 3 at its pivotal position. The turntable 6 is horizontally held by the holder roller assembly 8 being set around the coupling unit 7, while the turntable rotates itself on receipt of the revolution force from the coupling 7.

Figure 3:
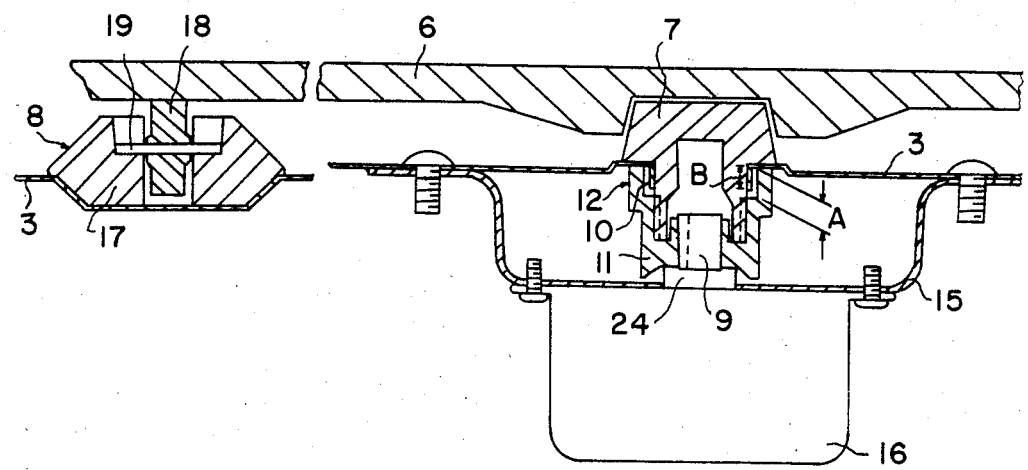
FIG. 3 shows the sectional view of the main part of the turntable drive unit of the microwave oven shown in FIG. 2.
Figure 4:
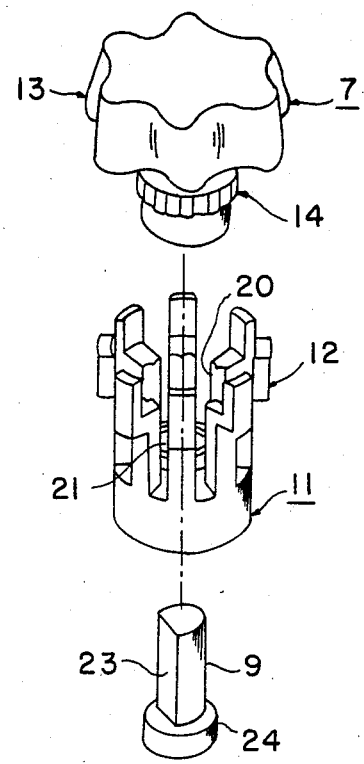
FIG. 4 shows the exploded view of the main part of the turntable drive unit shown in FIG. 2.

FIG. 3 shows the sectional views of the coupling unit 7 and ambient portions of the holder roller assembly 8. FIG. 4 shows the exploded view of the main part of the drive unit including the coupling 7. The choke hole 10 with its choke portion projecting downward is provided in the center of the bottom plate 3 of the oven. The output shaft 9 of the drive motor 16 is provided in the center of the choke hole 10. The drive motor 16 is secured to the motor base plate 15 which is fastened to the back of the bottom plate 3 of the oven with screws. The holder roller assembly 8 is secured to the upper surface of the bottom plate 3 of the oven, while the assembly 8 comprises the roller holder 17 that horizontally holds the roller shaft 19 and the roller 18 secured to the roller shaft 19. The lateral surface of the roller 18 projects onto the upper surface of the roller holder 17. In this embodiment, a pair of the table holder roller units 8 are installed around the choke hole 10, while each roller unit rotates in contact with the bottom surface of the turntable 6 connected to the coupling 7, thus making it possible to smoothly turn the turntable 6 by horizontally holding it. The coupling unit 7 is provided with the connector 13 that fits the back of the pivot of the turntable 6 in its upper position and also with the connector shaft 14 that fits the connector nail 12 of the coupling holder at its lower position as shown in FIG. 4. The coupling unit 7 itself is made of the molded plastics. The connector 13 has 6 convexes on its lateral surface, while each of these is engaged with the concave formed in the pivotal center of the turntable 6. Both the convexes and concaves have the identical shapes. By coupling the connector 13 with the pivotal center of the turntable 6, the turntable 6 is securely connected to the coupling unit 7. The connector shaft 14 has a diameter which is smaller than the outer circumference of the connector 13 and almost equal to the inner diameter of the choke hole 10.

Figure 5:
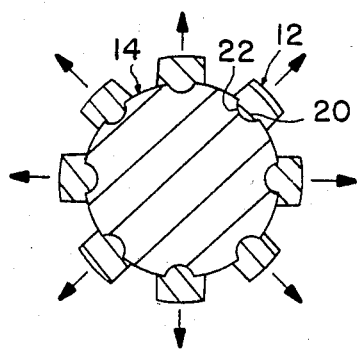
FIG. 5 shows the sectional view of the connector part connecting between the coupling unit 7 shown in FIG. 2 and the coupling holder 11.
Figure 7:
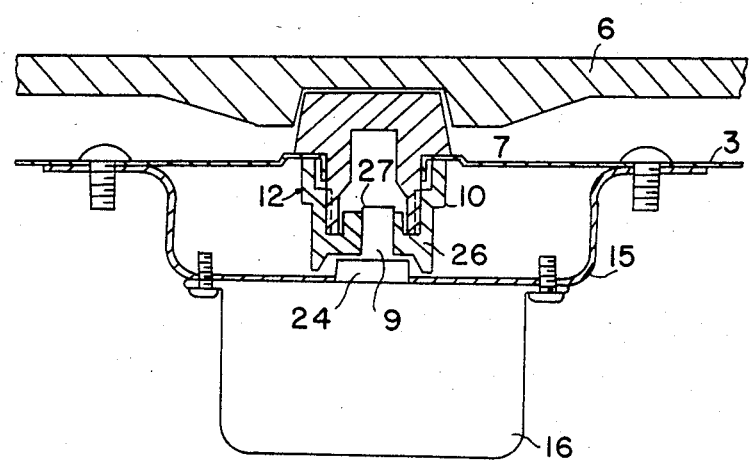
FIG. 7 shows the sectional view of the main part of the turntable drive unit showing the structure related to the installation of a still further coupling holder.

The coupling holder 11 is provided with 8 units of the connector 12 which are installed at equal intervals around the upper space and also provided with a connector hole 21 which is engaged with the output shaft 9 at the bottom. The coupling holder 11 itself is also made of the molded plastics. The lower part of the connector nail 12 internally projects from the outer circumference of the coupling holder 11 to form the projection 20 being connected to the connector shaft 14 of the coupling 7. The upper part of the connector nail 12 is externally open from the outer circumference of the coupling holder 11. FIG. 5 shows the sectional view of the connector shaft being engaged with the connector nail 12. There are 8 of the grooves 22 that are respectively provided in the direction of the shaft at equal intervals along the outer circumference of the middle part of the connector shaft 14. The lower part of the connector shaft has the cylindrical shape having the smaller outer diameter than that of the bottom of the groove 22. The connector shaft 14 is engaged with the connector nail 12 by causing the projection 20 to be coupled with the groove 22. There is a space being greater than the outer circumference of the connector hole 21 in the lower part of the connector shaft 14. By engaging the connector shaft 14 with the connector nail 12, the inner part of the connector shaft 14 remains without being in contact with the connector hole 21. The inner diameter that links the tip part of each projection 20 is slightly smaller than the diameter linking the bottom of groove 22 of the connector shaft 14. By engaging the coupling 7 with the coupling holder 11, the connector shaft 14 is engaged with the connector nail 12 by causing the connector nail 12 to be externally expanded. The connector nail 12 thus being engaged with the connector shaft 14 is pressed against the groove 22 by the elesticity of the plastics, thus providing a steady connection. The output shaft 9 has such a portion which is partly cut out along its pivotal axis. The output shaft 9 is inserted into the connection hole 21 that has the identical shape to that of the cutout portion of the output shaft 9 so that the coupling holder 11 can be engagaed with the output shaft 9. Boss 24 having a greater diameter than that of the output shaft 9 is provided in the lower part of the output shaft 9. In the improved turntable drive unit, as shown in FIG. 3, by enagging the coupling holder 11 with the output shaft 9, the drive motor 16 is securely installed to the motor base plate 15. The coupling holder 11 being coupled with the output shaft 9 provides a certain clearance between the upper end of the connector nail 12 and the back of the bottom plate 3 ambient to the chole hole 10. As a result, the coupling holder 11 is installed onto boss 24 so that the coupling holder 11 is located between boss 24 and the bottom plate 3. This allows the coupling holder 11 to rotate itself without coming into contact with the bottom plate 3 while the output shaft rotates. As shown in FIG. 3, since depth A of the concave formed at the upper end of the connector nail 12 is deeper than the height B of the choke hole 10, the connector nail 12 remains without coming into contact with the choke part of the choke hole 10. Using the coupling holder which is in the position below the choke hole 10, the connector shaft 14 of the coupling 7 is inserted into the choke hole 10 so that the connector shaft 14 can be engaged with the nail 12 of the coupling holder 11. By engaging the pivotal center of the turntable 6 with the connector 13 in the upper part of the coupling 7, the turntable 6 is connected to the output shaft 9 via the coupling 7 and the coupling holder 11.

Since the coupling 7 and the coupling holder 11 are engaged with each other, the projection 20 of the connector 12 is also coupled with the groove 22 of the connector shaft 14. Using its own elasticity, the connector nail 12 presses the connector shaft 14 against its pivotal center to hold the outer circumference of the connector shaft 14. This permits the revolution force of the output shaft 16 to drive the coupling 7, and at the same time, prevents the coupling 7 from escaping upwards. The connector nail 12 either expands or shrinks itself in the radius direction due to own elasticity of the plastics. So, even if the turntable 6 is manually rotated, the connector nail 12 externally expands itself as shown by the arrow in FIG. 5, thus setting the projection 20 free from the groove 22 to cause the coupling 7 to slip itself. As a result, since the external force applied to the turntable 6 cannot be transmitted to the output shaft 9, even if the turntable is manually rotated, the drive motor 16 can be safely protected from possible destruction that will otherwise occur when receiving an an excessive torque force.

As described above, the preferred embodiment of the present invention provides the improved configuration in which the coupling unit 7 is held by the choke hole 10 that functions as the coupling receiver, and engages the coupling 7 with the output shaft 16 via the coupling holder 11. The improved configuration eliminates the conventional coupling parts and permits the entire turntable drive unit to be simply built at minimized cost, and yet, since the conventional parts have been eliminated by large part, an overall cost reduction can be achieved during the production and assembly. The improved configuration also eliminates spacers and coupling receivers. Instead, the bottom plate 3 of the oven only needs a choke hole 10 to house the connector shaft 14 connecting to the coupling 7, thus making it possible to achieve a compact-size drive unit.

In the above preferred embodiment, the coupling holder 11 is installed onto boss 24 so that it is in the position between the back of the bottom plate 3 and boss 24.

Figure 6:
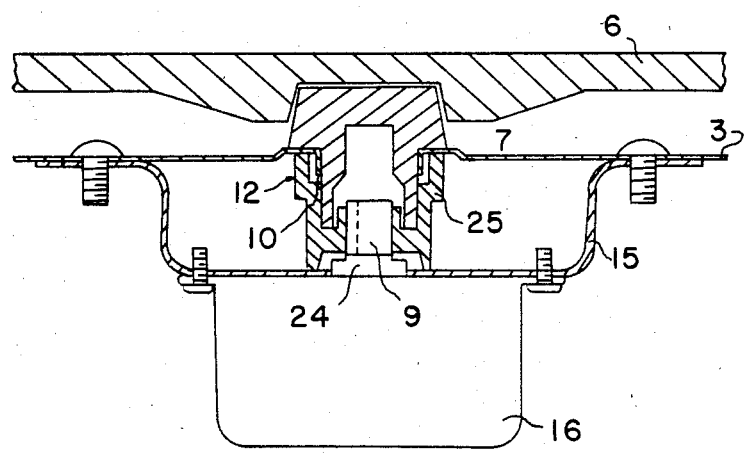
FIG. 6 shows the sectional view of the main part of the turntable drive unit showing the structure related to the installation of another coupling holder.

As another preferred embodiment, as shown in FIG. 6, the improved configuration may also provide a concave in the bottom of the coupling holder 25 so that the coupling holder 25 can be directly mounted on the motor base plate 15 without coming into contact with boss 24. In this embodiment, the coupling holder 25 is mounted on the motor base plate 15 and provides a little clearance on the back of the bottom plate 3 around the tip part of the coupling holder 25. A still further preferred embodiment may provide a little clearance between the tip portion of the coupling holder 26 and the back of the bottom plate 3 so that the coupling holder 26 can be held by the cutout surface 27 of the output shaft 9 and the coupling holder 26 can securely be held only by the output shaft 9.

What is claimed is:

1. A microwave oven, comprising:
   a turntable;
   a drive unit for rotating said turntable; and
   a coupling connecting an output shaft of said drive unit to said turntable;
   said coupling comprising:
   a first coupling element having an upper portion engaging the underside of the center of said turnable; and
   a second coupling element having an upper portion comprising a plurality of prongs engaging a lower portion of said first coupling element therebetween and a lower portion engaging said output shaft;
   said oven including a bottom plate formed with a choke opening having a choke portion extending downwardly from the back plate, said lower portion of said first coupling element being inserted through said choke opening into engagement with said second coupling element.

2. A microwave oven as claimed in claim 1, wherein said upper portion of said first coupling element has a peripheral shape which fits into a corresponding shaped recess in said underside of said turntable.

3. A microwave oven as claimed in claim 1, wherein said prongs resiliently engage said first coupling element.

4. A microwave oven as claimed in claim 1, wherein said prongs resiliently engage parallel grooves in the periphery of said lower portion of said first coupling element.

* * * * *